United States Patent
Sjögren et al.

(10) Patent No.: US 6,169,048 B1
(45) Date of Patent: Jan. 2, 2001

(54) METHOD OF MANUFACTURING WHISKER-REINFORCED CERAMICS

(75) Inventors: Clas Sjögren, Saltsjö-Boo; Gunnar Brandt, Solna; Ola Lyckfeldt, Göteborg, all of (SE)

(73) Assignee: Sandvik AB, Sandviken (SE)

( * ) Notice: Under 35 U.S.C. 154(b), the term of this patent shall be extended for 0 days.

(21) Appl. No.: 09/204,355

(22) Filed: Dec. 4, 1998

(30) Foreign Application Priority Data

Dec. 22, 1997 (SE) .................................................... 9704844

(51) Int. Cl.$^7$ .............................. C04B 35/71; C04B 35/52
(52) U.S. Cl. ........................ 501/95.3; 501/89; 501/128; 264/641; 264/669; 264/681; 264/682
(58) Field of Search ........................... 501/95.3, 89, 127, 501/128; 264/641, 669, 682, 681

(56) References Cited

U.S. PATENT DOCUMENTS

| | | |
|---|---|---|
| 4,543,345 | 9/1985 | Wei . |
| 4,849,381 | 7/1989 | Brandt et al. . |
| 4,867,761 | 9/1989 | Brandt et al. . |
| 5,030,600 | * 7/1991 | Hida et al. ............................. 501/98 |
| 5,340,532 | 8/1994 | Bergström . |
| 5,618,757 | * 4/1997 | Benker ................................... 501/90 |
| 5,648,029 | 7/1997 | Collin . |

FOREIGN PATENT DOCUMENTS

| | | |
|---|---|---|
| 579 587 | 7/1993 | (EP) . |
| 2214178 | 1/1989 | (GB) . |
| 2-289473 | 4/1989 | (JP) . |
| 02 199076 | 8/1990 | (JP) . |
| WO 89/01920 | 3/1989 | (WO) . |

* cited by examiner

*Primary Examiner*—Karl Group
(74) *Attorney, Agent, or Firm*—Burns, Doane, Swecker & Mathis, L.L.P.

(57) ABSTRACT

A method of making a whisker-reinforced ceramic body by hot pressing a preform to a disc, cutting the disc into blanks and grinding the blanks to bodies of desired shape and dimension is disclosed. The preform is prepared by dispersing 10–60% by volume of a ceramic powder mixture containing conventional sintering aids and/or grain growth inhibitors in water or an organic solvent adding 1–15 wt-% starch to the dispersion;

pouring the dispersion into a mold with desired shape;

heating the suspension to 50°–100° C. for 2–4 hours while covering the mold to avoid water evaporation to form a preform;

removing the preform from the mold; and presintering the preform in air for 10 h at a maximum temperature of about 600° C.

7 Claims, 1 Drawing Sheet

METHOD OF MANUFACTURING WHISKER-REINFORCED CERAMICS

BACKGROUND OF THE INVENTION

The present invention relates to a method of manufacturing whisker-reinforced ceramic cutting tool inserts with improved structure homogeneity.

It is well-known in the art that the fracture toughness of a ceramic material can be increased by addition of monocrystalline hair crystals (whiskers) and/or platelets. SiC-whiskers in an alumina matrix are disclosed in U.S. Pat. No. 4,543,345. U.S. Pat. No. 4,867,761 discloses the use of carbides, nitrides or borides of Ti and/or Zr in an alumina matrix. U.S. Pat. No. 4,849,381 discloses a cutting tool insert comprising a mixture of whiskers and platelets.

Cutting tool inserts made of SiC-whisker-reinforced alumina are an established product on the cutting tool market mainly used for the machining of heat resistant materials and to some extent for machining of cast iron.

Whisker-reinforced ceramic inserts are generally manufactured by uniaxial pressure sintering. Another possible way to manufacture such inserts is by tool pressing and glass encapsulated hot isostatic pressing. This latter manufacturing method is mainly used for inserts with more complex geometries. In both cases, the powder that is filled into the pressing tool has to be granulated in order to obtain necessary flow properties. The most common way of granulating such powders is by spray-drying technique. Spray drying means that a slurry containing the powdery components of the final composition is dried and granulated in hot gas in the same process step. However, during spray drying, the whiskers are drawn into the middle of the granules and the granule borders are depleted of whiskers. As a result the granules have a core armored by whiskers and cannot therefore be completely crushed during the subsequent compaction process. This leads to an inhomogeneous structure with visible granule borders in the sintered material.

An alternative to conventional spray drying is disclosed in U.S. Ser. No. 08/827,878 (our reference: 024000-965). In this case, the granulation is performed by freeze granulation followed by freeze drying. As a result, a ceramic body with homogeneous structure with essentially no granule borders is obtained.

GB 2,214,178 discloses the manufacture of whisker-reinforced ceramics by freeze drying a whisker/powder suspension. The resulting 'cake' is then shaken to break up the agglomerates which are sifted through a 1 mm sieve. The powder is then compacted and sintered. The powder obtained after sifting has very poor flow properties and the method can only be used in the manufacture of bodies of simple shape such as cylinders, circular discs, etc., which are subsequently ground to final shape and dimension.

A method of obtaining a whisker-reinforced ceramic body with a structure essentially free of granule borders and an essentially one-dimensional whisker orientation by injection molding is disclosed in U.S. Pat. No. 5,648,029.

In U.S. Pat. No. 5,340,532, a method of forming ceramic bodies by temperature induced flocculation is disclosed which, if applied to whisker-reinforced ceramic bodies, gives a structure essentially free of granule borders and with an isotropic whisker orientation.

Pressure sintering techniques as hot pressing or hot isostatic pressing are normally required for whisker-reinforced alumina materials if the whisker content exceeds 10–15 weight %. Hot pressing is the preferred performance for articles of simple geometrical shapes. HIPping requires canning (gas-impermeable envelope) since closed porosity cannot be obtained using pressureless sintering. Glass encapsulation is the preferred method for complicated shapes.

Whisker-reinforced ceramics are produced using dispersions of the powder and whisker constituents in a liquid. Further steps in the processing of the slurry involve normally a granulation step using spray-drying, freeze-drying or simply granulation in a mixer or similar methods. The powder obtained contains roughly spherical agglomerates with sizes ranging from 25 $\mu$m to 200 $\mu$m and offers better flow properties than ungranulated powders which is essential for uniform filling of the die.

The powder to be densified is normally precompacted in a graphite die in order to minimize the stack height and to increase the number of parts that can be produced in one hot pressing run. Too loose a powder can lead to nonuniform density in the sintered part since powder flow in the hot press is restricted due to die wall friction and especially for whisker-reinforced materials also due to a large flow resistance in the powder itself because of the whiskers.

An alternative to produce granulated powder to fill the graphite dies could be to preform the desired shape (i.e., a disc) using consolidation in an impermeable mold.

Several techniques are known and are in principle possible, for example, consolidation by a polymerization reaction (Gel Casting), destabilization (Direct Coagulation Consolidation, DCC), polycondensation reactions (Hydrolysis Assisted Solidification, HAS) or freezing.

Still, each of the existing methods has disadvantages, such as the use of toxic initiators in water-based gel casting, expansion and ice crystals in water-based systems, or contraction when using organic solvents in freeze forming or low wet-body strength in DCC and HAS.

Starch particles have previously been used as a filler in various ceramic materials to produce materials with controlled porosity. Potential applications include supports for ceramic membranes, filters, gas burners and bioceramics. The pore size of the ceramic material is related to the original size of the starch particles.

OBJECTS AND SUMMARY OF THE INVENTION

It is an object of this invention to avoid or alleviate the problems of the prior art.

It is further an object of this invention to provide a method of manufacturing whisker-reinforced ceramic cutting tool inserts with improved structure homogeneity.

In one aspect of the invention there is provided a method of making a whisker-reinforced ceramic body preform by:

dispersing 10%–60% by volume of a ceramic powder mixture containing conventional sintering aids and/or grain growth inhibitors in water or an organic solvent;

adding 1–15 wt-% starch to the dispersion;

pouring the dispersion into a mold of a desired shape;

heating the suspension to 50°–100° C. for 2–4 hours while covering the mold with a lid;

further heating without the lid to complete drying;

removing the preform form from the mold; and presintering the preform in air for 10 h at about 600° C.

In another aspect of the invention there is provided a ceramic body comprising 2–50 volume-% SiC-whiskers of which the SiC-phase is present as >95% cubic β-SiC in a ceramic matrix in which body the structure and composition is uniform, free from granule borders and with a uniform distribution of whiskers and in which the orientation of the whiskers is three-dimensional, the degree of orientation (texture) of the whiskers as determined by X-ray diffraction is 1.0<T<2.5, where T is $$T=[(SiC_1/SiC_2)p/(SiC_1/SiC_2)c]^{0.5}$$

where $SiC_1$=the intensity from the {1010}-peak of the hexagonal α-SiC $SiC_2$=the sum of the intensity from the {111}-peak of the cubic β-SiC and {0002} peak of the hexagonal α-SiC p is from a plane perpendicular to the direction of the compaction c is from a plane parallel to the direction of the compaction.

DETAILED DESCRIPTION OF THE PREFERRED EMBODIMENTS OF THE INVENTION

Figure 1:
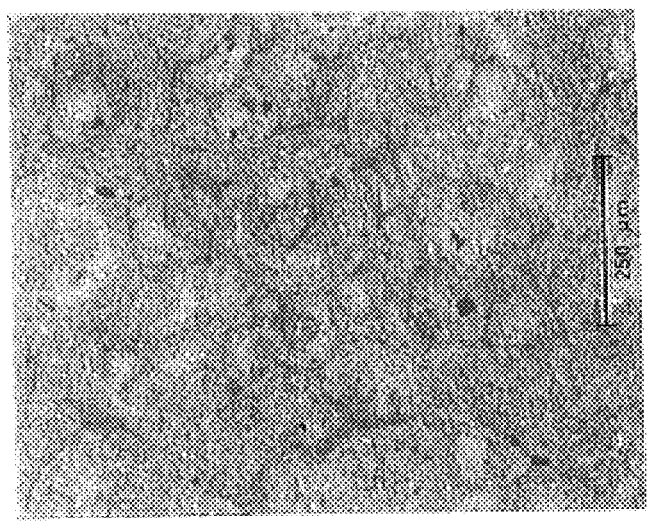
FIG. 1 shows in 100× the microstructure of alumina containing 25 weight % silicon carbide whisker using spray dried powder.
Figure 2:
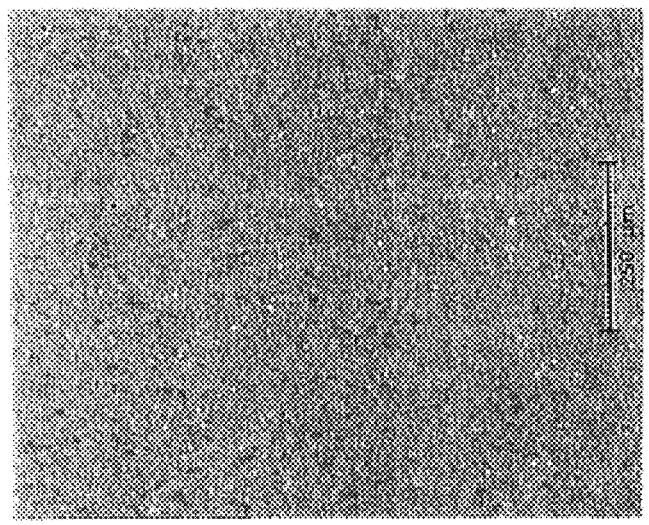
FIG. 2 shows in 100× magnification the microstructure of alumina containing 25 weight % silicon carbide whisker using rice starch consolidation.

It has now surprising been found that starch consolidation can be used for producing preforms for hot pressing of whisker-reinforced ceramics. The starch particles are used as a consolidator/binder to produce preforms for hot pressing of non-porous high strength whisker-reinforced ceramics.

The present invention particularly relates to the manufacturing of whisker-reinforced inserts preferably for machining of heat resistant alloys where a chipbreaker on the insert is not needed. This is why consolidation to simple geometrical shapes is the preferred embodiment, i.e., hot pressing. For inserts for steel machining, which require chip breakers, consolidation with encapsulated HIP-sintering is needed.

According to the present invention, there is now provided a method of manufacturing a whisker-reinforced ceramic body by powder metallurgical methods, i.e., dispersion in a suitable liquid, consolidation, compaction and sintering. As a result, a ceramic body with homogeneous structure with essentially no granule borders is obtained.

In the method according to the present invention, the ceramic powders containing conventional sintering aids and/or grain growth inhibitors are thoroughly mixed preferably by dispersion in water or an organic solvent. The dispersion can be facilitated/improved by addition of organic additives and/or by adjustment of the pH-value when dispersing in water. The dry content of the dispersion shall be in the range 10–60% by volume, preferably 45–60% by volume. To the dispersion is further added 1–15 weight %, preferably 1–4 weight %, starch. Higher dry content of the dispersion requires lower starch content. Starch is the natural existing polymeric compounds or modifications thereof, extracted from seeds of cereal grains or roots of various plants, folded into granules. The shape and size of the granules vary and depend on from which plant it originates. The starch can be in chemical modified form, for example, by etherification to make it more stable towards mechanical treatment and acidic conditions. After the starch has been properly dispersed, the resulting suspension is poured into a plastic or metallic mold with the shape of the preform (diameter and height). Consolidation, that is, transformation of the suspension from fluidity to rigidity, is achieved by heating to 50°–100° C., preferably 70–90° C., for 2–4 hours while covering the mold with a lid to avoid water evaporation. The lid is removed to complete the drying in the mold after the consolidation step. After the drying is completed, removal of organic materials and presintering of the preform is conducted in air for about 10 h at a maximum temperature of about 600° C. at a heating rate of 1° C./min. After that, the preform is hot pressed at 1850° C. and about 25 MPa. As a result of the hot pressing, a disc is obtained which is sawcut to blanks and ground to inserts of desired shape and dimension.

The method according to the present invention is applicable to all kinds of whisker-reinforced ceramic materials comprising, in addition, conventional sintering aids and/or grain growth inhibitors, 2–50%, preferably 15–35%, by volume of single crystals whiskers and/or fibers and/or platelets and/or submicron particles of carbides, nitrides and/or borides of Si, Ti, Zr, Hf, Ta, and/or Nb or solid solutions thereof. The whisker/fiber material consists of hair-shaped monocrystals/polycrystals with a diameter of 0.2–10 μm and a length of 2.5–100 μm and a length/diameter ratio of preferably 5–10. The platelets are monocrystal plates with a diameter of 0.5–40 μm and a diameter/thickness ratio of 5–50, preferably 10–20. The submicron particles generally have a size <500 nm.

The grain size of the ceramic matrix shall be <10 μm, preferably <4 μm. The matrix is based on ceramic oxides, preferably $Al_2O_3$, or ceramic nitrides, preferably $Si_3N_4$, possibly further containing hard carbides and/or nitrides and/or borides and/or binder metal. The ceramic matrix shall preferably contain <20 volume % $ZrO_2$. The relative density shall be at least 95%, preferably 98%, most preferably 99%.

The method compared to known methods has several advantages:

The powder mixture handling is completely eliminated which offers reduced production steps with better production economy. It also minimizes the risk of creation of airborne whiskers which is a potential health hazard and consequently reduces the need for personal protection equipment; and The use of consolidated preforms with a higher green density than (precompacted) loose agglomerated powders leads to a more uniform sintered density of the finished product (e.g., less variation in performance of the inserts).

In contrast to spray dried powders, a much more uniform microstructure is obtained. In contrast to spray freezing (U.S. Ser. No. 08/827,878), which gives a uniform microstructure, a much higher green density is obtained which gives less texture of the whiskers in the sintered material since the vertical movement of the punch is very much reduced.

The texture (T) (degree of orientation) of the whiskers in the sintered material can be determined by X-ray diffraction. Provided that the SiC-phase is present as >95% cubic β-SiC-whiskers:

$$T=[(SiC_1/SiC_2)p/((SiC_1/SiC_2)c]^{0.5}$$

where $SiC_1$—the intensity from the {1010}-peak of the hexagonal α-SiC $SiC_2$=the sum of intensity from the {111}-peak of the cubic β-SiC and {0002}-peak of the hexagonal α-SiC p=plane perpendicular to the direction of compaction c=plane parallel to the direction of compaction Typical values for spray dried material are T=2.5–3.0 and even higher for freeze dried materials (T=4.0–5.0).

A material according to the invention has a T-value of 1.0–2.5, preferably about <2.0, which means that the properties are less orientation dependent. Cracks running parallel to the rake face will experience higher resistance to propagation which means less tendency for flaking or top-slice fractures.

The invention is additionally illustrated in connection with the following Examples which are to be considered as illustrative of the present invention. It should be understood, however, that the invention is not limited to the specific details of the Examples.

EXAMPLE 1

An alumina (Ceralox APA) 0.5–25% by weight silicon carbide whisker (ACMC SC-9) mixture containing small amounts of magnesia and yttria as sintering aids, was dispersed in water using DISPEX as a dispersing agent. The powder loading was 40% by volume. 6% by weight of 2 $\mu$m rice starch granules (modified rice starch, Starch Remyline DR, AB R. Lundberg) was added and the suspension was poured into a cylindrical plastic form covered with a teflon film.

Upon heating in air for 3 hours at 75° C., the preform consolidated and could, after further drying, be removed from the form.

The preform thereafter was presintered in air for 10 h at 600° C. and subsequently hot pressed at 1850°C. at 28 MPa.

A spray dried powder of the same nominal composition was hot pressed to a disc under identical conditions for comparison.

The sintered discs were diamond saw cut to blanks for producing inserts (ISO-designation RNGN 120700 T01020).

EXAMPLE 2

The samples from the preceding Example were tested in a grooving and widening operation with coolant in Inconel 718.

The following cutting conditions were used:

Cutting speed: 250 m/min

Feed: 0.15 mm/rev

Depth of Cut: 6 mm

Cutting fluid: Yes

One cut is defined as a grooving operation followed by a widening by 30% in two steps.

The number of cycles until a Flank Wear ($VB_{max}$)>0.50 mm was reached was measured. In addition, the number of cycles until Tool Life ($Vb_{max}$)>1 mm and/or large top slice fractures.

The results are shown in Table 1 (Flank Wear) and Table 2 (Tool Life)

TABLE 1

Number of Cycles to $Vb_{max}$ = 0.5 mm

| Variant | Number of Cycles | | | | Average | Variation | Relative |
|---|---|---|---|---|---|---|---|
| Spray Dried | 5.7 | 5.5 | 6.3 | 4.1 | 5.4 | 1.0 | 1.0 |
| Invention | 6.8 | 5.6 | 7.6 | 5.7 | 6.4 | 0.9 | 1.2 |

TABLE 2

Number of Cycles to Tool Life

| Variant | Number of Cycles | | | | Average | Variation | Relative |
|---|---|---|---|---|---|---|---|
| Spray Dried | 11 | 7 | 11 | 5 | 8.5 | 3.0 | 1.0 |
| Invention | 11 | 10 | 12 | 13 | 11.5 | 1.3 | 1.4 |

It can be observed that an increase of the wear resistance with 20% is obtained but the increase in tool life is 40% due mainly to reduced tendency for rake face flaking (dependent on whisker orientation) and less variation in performance (dependent on uniformity of microstructure).

EXAMPLE 3

An alumina (Ceralox APR-0.5) and 25% by weight silicon carbide whisker (ACMC SC-9) mixture containing small amounts of magnesia and yttria as sintering aids, was dispersed in water using DISPEX as a dispersing agent. The powder loading was 57% by volume. 2% by weight (calculated on the dry powder) of 20 $\mu$m rice starch granules (modified rice starch, Mikrolys 54, Lyckeby Stärkelse AB, Sweden) was added and the suspension was poured into a cylindrical aluminum mold surface coated with a teflon film.

Upon heating in air for 3 hours at 75° C., the preform consolidated and could, after further drying, be removed from the mold.

The preform thereafter was presintered in air for 10 h at a maximum temperature of 600° C. using a temperature increase rate of 1° C./min from room temperature.

The preform thereafter was pressed at 1850° C. at 28 MPa together with freeze granulated powder of the same nominal composition for comparison.

The texture coefficient T was 1.6 for the starch consolidated material and 3.2 for the freeze granulated material.

The sintered discs were diamond saw cut to blanks for producing inserts (IS)-designation RNGN 120700 T01020).

EXAMPLE 4

The inserts from Example 3 were tested in a grooving and widening operation with coolant in Iconel 718.

The following cutting conditions were used:

Cutting speed: 250 m/min

Feed: 0.15 and 0.25 mm/rev

Depth of cut: 6.0 mm

Cutting fluid: Yes

One cut is defined as a grooving operation followed by a widening by 30% in two steps.

The number of cycles until a "Flank Wear" (VBmax)>0.5 mm was reached was measured.

VBmax is the total amount of wear on the flank face including besides pure flank wear also edge line fractures.

The results are shown in Table 3 (0.15 mm/rev) and Table 4 (0.25 mm/rev)

TABLE 3

Number of Cycles to VBmax = 0.5 mm at 0.15 mm/rev

| Variant | Number of Cycles | | | | Average | Variation | Relative |
|---|---|---|---|---|---|---|---|
| Freeze Dried | 7.8 | 9.7 | 8.5 | 10.0 | 9.0 | 1.0 | 1.0 |
| Invention | 13.1 | 18.0 | 18.0 | 15.0 | 16.0 | 2.4 | 1.8 |

TABLE 4

Number of Cycles to VBmax = 0.25 mm/rev

| Variant | Number of Cycles | | | | Average | Variation | Relative |
|---|---|---|---|---|---|---|---|
| Freeze Dried | 4.6 | 1.9 | 1.7 | 1.9 | 2.5 | 1.4 | 1.0 |
| Invention | 4.5 | 3.9 | 4.2 | 4.7 | 4.3 | 0.3 | 1.7 |

The increase in tool life is especially notable at the high feed rate due to a less tendency for edge fractures.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A method of making a reinforced ceramic body preform by:

dispersing 10%–60% by volume of a ceramic powder mixture containing conventional sintering aids and/or grain growth inhibitors, and reinforcing elements in water or an organic solvent;

adding 1–15 wt-% starch to the dispersion thereby forming a suspension;

pouring the suspension into a mold;

heating the suspension to 50°–100° C. for 2–4 hours while covering the mold with a lid;

further heating without a lid to complete drying;

removing the preform form from the mold; and presintering the preform in air for 10 h at a maximum temperature of about 600° C.

2. The method of claim 1 wherein the preform is hot-pressed to a disc.

3. The method of claim 2 wherein the disc is converted to a cutting insert body.

4. The method of claim 1 wherein 1–4 wt-% starch is added to the dispersion.

5. The method of claim 4 wherein 45–60% by volume of a ceramic powder mixture is dispersed in water or an organic solvent.

6. The method of claim 1 wherein the ceramic powder mixture is dispersed in water.

7. The method of claim 1, wherein the reinforcing elements are chosen from at least one of whiskers, fibers, platelets and submicron particles.

* * * * *